US006789482B2

United States Patent
Yokoyama et al.

(10) Patent No.: US 6,789,482 B2
(45) Date of Patent: Sep. 14, 2004

(54) PRINTING METHOD, RECORDING MEDIUM CONTAINING A PROGRAM FOR APPLYING THE PRINTING METHOD, PRINTER, PRINTER DRIVER, POS TERMINAL, AND POS SYSTEM

(75) Inventors: Kazuyuki Yokoyama, Suwa (JP); Masahiro Minowa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/647,870

(22) Filed: Aug. 25, 2003

(65) Prior Publication Data

US 2004/0112236 A1 Jun. 17, 2004

(30) Foreign Application Priority Data

Aug. 26, 2002 (JP) ........................................ 2002-245462
Aug. 8, 2003 (JP) ........................................ 2003-206896

(51) Int. Cl.[7] ........................... B41C 47/60; B41J 11/26; B41J 5/30
(52) U.S. Cl. ....................... 101/483; 400/615.2; 400/61; 400/65
(58) Field of Search ................... 101/483; 400/615.2, 400/61, 65; 358/1.15, 2.1, 1.12, 1.9; 347/171; 705/408

(56) References Cited

U.S. PATENT DOCUMENTS 4,584,573 A * 4/1986 Ito .......................... 400/124.02
5,393,147 A * 2/1995 Ueno et al. .................... 400/65
5,819,241 A * 10/1998 Reiter ......................... 705/408
5,947,619 A   9/1999 Kurashina et al. ........ 400/615.2
6,062,750 A * 5/2000 Ueno et al. .............. 400/615.2
6,164,847 A * 12/2000 Allen .......................... 400/74
6,340,255 B1 * 1/2002 Konishi et al. .......... 400/615.2
6,449,377 B1 * 9/2002 Rhoads ....................... 382/100
6,646,649 B1 * 11/2003 Tanabe et al. .............. 345/588
2001/0032251 A1   10/2001 Rhoads et al. .............. 709/217
2002/0077892 A1   6/2002 Goring ........................ 705/14

FOREIGN PATENT DOCUMENTS

| EP | 1 035 527  | 9/2000  |
| EP | 1 170 938  | 1/2002  |
| JP | 8-161636   | 6/1996  |
| JP | 8-161645   | 6/1996  |
| JP | 9-286093   | 11/1997 |
| JP | 10-134253  | 5/1998  |
| JP | 10-222761  | 8/1998  |
| JP | 11-185019  | 7/1999  |

* cited by examiner

Primary Examiner—Andrew H. Hirshfeld
Assistant Examiner—Wasseem H. Hamdan
(74) Attorney, Agent, or Firm—Micheal T. Gabrik

(57) ABSTRACT

Color graphic-based receipts can be issued from a color printer without changing a monochrome, text-based application. The printer generates background image data by laying out multiple copies of unit image data representing a unit image used to build the background pattern, and then applying a filter. When print data is sent from the terminal, the printer adds this background image data to the print data to produce the print data with an embedded background image. The print data with embedded background image is then printed to receipt.

35 Claims, 14 Drawing Sheets (a)

| BASIC | UNIT IMAGE | COLOR PRINTING | LAYOUT PATTERN | FILTER | MORE | ← D11

- UNIT IMAGE  　　　　　　　AVAILABLE FILES
- FILE  [C:fire.jpg] 202　　 [U0/C:hana.jpg]
- ID    [U2] 203　　　　　　 [U1/C:ami.jpg]  201
- ENLARGE/REDUCE [120%] 204
- [OK] 205

(b)

| BASIC | UNIT IMAGE | COLOR PRINTING | LAYOUT PATTERN | FILTER | MORE | ← D12

- COLOR PRINTING
  - ● YES   ○ NO
  - BACKGROUND COLOR [Red] 211
  - [OK] 212

(c)

| BASIC | UNIT IMAGE | COLOR PRINTING | LAYOUT PATTERN | FILTER | MORE | ← D13

- LAYOUT PATTERN
  - LAYOUT TYPE
    - ○ (A)   ● (B)   ○ (C)
  - LAYOUT PITCH
    - ● USER-DEFINED   ○ DEFAULT SETTINGS
    - HORIZONTAL PITCH [0.2] mm — 221
    - VERTICAL PITCH [0.2] mm
    - [OK] 222

FIG. 7

[ PRINT SAMPLE 3 ]

FIG.11

[ PRIOR ART SAMPLE ]

FIRE MARK

TEL : x x-x x x x-x x x x
July 4th, 2003 (Fri) 15:30

Receipt

| | | |
|---|---|---|
| Boiled Eggs | 1 case | ¥ 200 |
| Tissue Paper | 1 case | ¥ 450 |
| Shampoo | 1 | ¥ 500 |
| Rice | 1 pack | ¥ 4,500 |
| Beef | 2 Kg | ¥ 800 |
| Eggplants | 1 pack | ¥ 300 |
| Potatoes | 1 pack | ¥ 250 |
| Fishes (A) | 1 pack | ¥ 400 |
| Fishes (B) | 1 pack | ¥ 1,200 |
| Vitamin C | 1 | ¥ 400 |

| | |
|---|---|
| Sub-total | ¥ 9,000 |
| TAX (5%) | ¥ 450 |
| Total | ¥ 9,450 |

Thank You !

FIG.14

PRINTING METHOD, RECORDING MEDIUM CONTAINING A PROGRAM FOR APPLYING THE PRINTING METHOD, PRINTER, PRINTER DRIVER, POS TERMINAL, AND POS SYSTEM

BACKGROUND OF THE INVENTION

1. Field of the Invention

The present invention relates to a method for generating print data with an embedded background image and printing the print data to a receipt by acquiring print data generated by a host computer based on input data concerning product sales and then adding background image data to the acquired print data. The invention further relates to a recording medium carrying a program for implementing this printing method, a printer and a printer driver, as well as a POS terminal and a POS system.

2. Description of the Related Art

POS systems used in supermarkets, convenience stores, and other retail stores have a printer (e.g., a receipt printer) for printing sales receipts. These printers are typically monochrome, text-based printers for printing receipts. An example of the output of such printer is shown in FIG. 14. However, development of small, fast color printers has created demand for color POS printers.

Because most POS system application programs are written for printing monochrome text by means of a monochrome printer (such an application referred to below as a "monochrome, text-based application"), introducing a color printer to a POS system requires changing the POS application program to a color graphic-based application so that receipts can be printed in color and graphics can be inserted. Changing of a software program typically requires a significant capital investment. The problem, therefore, is that color POS printers are often not used to their greatest potential.

OBJECTS OF THE INVENTION

The present invention is directed to solving this problem. Accordingly, an object of the invention is to provide a method and apparatus for printing color graphic-based receipts without changing the monochrome, text-based application program. The invention also provides a computer-executable program for performing this printing method, a recording medium for storing and distributing the program, a printer, a printer driver, a POS terminal, and a POS system.

SUMMARY OF THE INVENTION

According to one aspect of the invention, a printing method for processing print data, e.g., regarding payment information, generated by a host computer, e.g., based on input data relating to a merchandise sale, is provided. The method generally comprises, acquiring the print data from the host computer; selecting a unit image to be used as a component of a background image; laying out multiple copies of the selected unit image in a selected layout pattern; selecting a filter for delineating an image area of the selected layout pattern or each copy in the layout pattern; filtering the selected layout pattern or each copy in the layout pattern using the selected filter to determine where the copies of the selected unit image are to be printed to produce the background image data; adding the background image data to the print data to produce print data with an embedded background image; and printing the print data with the embedded background image on receipt paper.

A printing apparatus for carrying out such processing is also provided according to another aspect of the invention. The apparatus comprises an input terminal configured to acquire the print data from the host computer and a background image data processor. That processor includes a unit image selection module configured to select a unit image to be used as a component of a background image, a layout module configured to lay out multiple copies of the selected unit image in a selected layout pattern, a filter selection module configured to select a filter for delineating an image area of the selected layout pattern or each copy in the layout pattern, and a filtering module configured to apply the selected filter to the selected layout pattern or each copy in the layout pattern to determine where the copies of the selected unit image are to be printed to produce the background image data. The apparatus further comprises a generator configured to add the background image data to the print data to produce print data with an embedded background image; and a printing unit configured to print the print data with an embedded background image on receipt paper.

By acquiring print data generated by a host computer and adding background image data thereto to generate print data with an embedded background image, the printing method and apparatus of this invention can issue color graphic-based documents, e.g., receipts, even when the host computer runs a monochrome, text-based application without the need to change this application.

Furthermore, because the background image data is produced by laying out plural unit images and then applying a filter, a wide range of background image data can be efficiently produced and printed even if there is little storage capacity for storing background image data.

Preferably, the printing unit can print multiple colors including at least a primary color and a secondary color other than the primary color, and can print the print data using the primary color and print the background image data using the secondary color. By thus printing the print data in the primary color and printing the background image data in a secondary color, a background image can be added to the receipt without degrading the readability of the print data. Readability is also improved by printing in color.

Preferably, the background image data is generated according to a configuration command sent from the host computer. By producing the background image data according to a configuration command sent from the host computer, the user can configure the background image without directly operating the printer. Preferably, the configuration command contains information specifying the print color of the background image, which enables the user to define the color used to print the background image as desired.

Preferably, a storage medium stores a plurality of unit images and the configuration command contains information specifying what unit image to use. That is, the configuration command contains a command selecting at least one unit image for use as an element in the background image from among the multiple unit image files. By thus storing multiple unit image files, more choices are available for creating the background image. In addition, a wide variety of background images can be produced by combining multiple unit images in the background image layout.

Preferably, a storage medium stores multiple filters, and the configuration command contains a command for selecting and applying one filter from among the available filters.

The filters can be image files or an algorithm for generating image data, such as an algorithm for drawing a circle or drawing a triangle. By thus storing multiple filters for filtering the background image, a wide range of background images can be produced.

Preferably, the configuration command also contains information specifying an enlargement factor for the unit image. This enables the size (enlargement or reduction) of the unit image to be specified according to the user's preference. This also eliminates the need to store multiple sizes of the same unit image, and thus reduces the storage capacity needed to store the unit images.

Preferably, there is a storage medium for storing multiple layout patterns, and the configuration command contains information specifying a particular layout pattern to be used. By thus storing multiple layout patterns, a wide range of background images can be generated.

Preferably, the configuration command also contains information specifying the layout pitch of the unit image. This enables the user to control the layout pitch as desired.

Preferably, the configuration command is generated by a printer driver provided in the host computer. When the printer driver thus generates the configuration command, the background image data can be configured from the host computer without changing the host computer application program.

In another aspect of the invention, a printing program embodied on a computer-readable medium contains instructions for carrying out any of the printing methods or any step(s) thereof described above when executed by a computer. The invention can thus provide a program for issuing color graphic-based receipts without changing the monochrome, text-based application run by the host computer.

A printer driver according to another embodiment of the present invention is provided in a host computer connected to a printing apparatus. The printer driver comprises a print acquisition module configured to acquire the print data an application program executed by the host computer and a background image data configuration module. That latter module includes a unit image selection module configured to select a unit image to be used as a component of a background image, a layout module configured to lay out multiple copies of the selected unit image in a selected layout pattern, a filter selection module configured to select a filter for delineating an image area of the selected layout pattern or each copy in the layout pattern, a filtering module configured to apply the selected filter to the selected layout pattern or each copy in the layout pattern to determine where the copies of the selected unit image are to be printed to produce the background image data, and a generator module configured to add the background image data to the print data to produce print data with an embedded background image. A transmission unit is configured to send the print data with an embedded background image to a printing apparatus.

With this printer driver, print data with an embedded background image is generated and sent to a printer for printing by adding background image data to print data produced by the host computer application. The printer can therefore print color graphic-based receipts without modification of the host computer application even when the host computer runs a monochrome, text-based application.

Furthermore, because the background image data is produced by laying out multiple copies of the unit image and applying a filter, a wide variety of background image data can be efficiently produced even when the storage capacity for storing background image data is small.

A POS terminal according to another aspect of the present invention comprises a printing apparatus as described above, and a terminal device functioning as the host computer. This POS terminal can therefore issue color graphic-based receipts from the printer without modifying the monochrome, text-based application used on the terminal device. The terminal device may further include a printer driver as described above, and a printer.

Still another aspect of the invention involves a POS system comprising at least one POS terminal as described above, and a POS server connected to each of the POS terminals via a network. The POS server manages the POS terminals. This POS system can also issue color graphic-based receipts from the printer without modifying the monochrome, text-based application run by the terminal device.

In another aspect of the invention there is a printing apparatus for fetching print data regarding payment information that is generated by a host computer and based on input data relating to a merchandise sale. The printing apparatus comprises a command interpreter configured to receive and analyze commands from the host computer; a print data processor configured to process fetched print data relating to payment transaction information according to a received print command; a background image data processor configured to process background image data according to a received configuration command for setting background image data; a print-data-with-background-image generator configured to combine the fetched print data with the background image data for printing according to a command for printing print-data-with-background-image. When the command for printing print-data-with-background-image is fetched, a pre-selected background image produced by the background image data processor and the fetched print data for payment transaction are synthesized to form the print-data-with-background-image.

By producing the print-data-with-background-image on the printer side, it is possible to reduce the time period for transferring all the print data to be printed on paper for a receipt so that the substantial printing through-put can be improved.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 shows sample configuration screens for configuring background image data, constructed according to embodiments of this invention;

FIG. 11 shows an example of a receipt (print sample 3) produced by the printing method of the present invention;

FIG. 14 shows a sample receipt printed by prior art relating to the present invention.

DESCRIPTION OF THE PREFERRED EMBODIMENTS

A printing method, a recording medium containing a computer-executable program for implementing, storing and distributing this printing method, a printer, a printer driver, a POS terminal, and a POS system according to preferred embodiments of the present invention are described below with reference to the accompanying figures.

In the embodiments described below, print data generated by a host computer (e.g., a terminal device) based on input data relating to merchandise sales is acquired, and background image data representing a background image (e.g., a watermark) is added to this print data to produce print data with an embedded background image. Thus comprised, our invention specifically enables printing color graphic-based receipts without modifying the application program even if the host computer runs a monochrome, text-based application.

The invention is described below in the context of a POS system such as that used in supermarkets, convenience stores, and other retail stores for printing receipts (printed output) based on input data relating to purchased merchandise entered by an operator. Such description is by way of example only. Aspects of the invention may also be realized in other environments.

Figure 1:
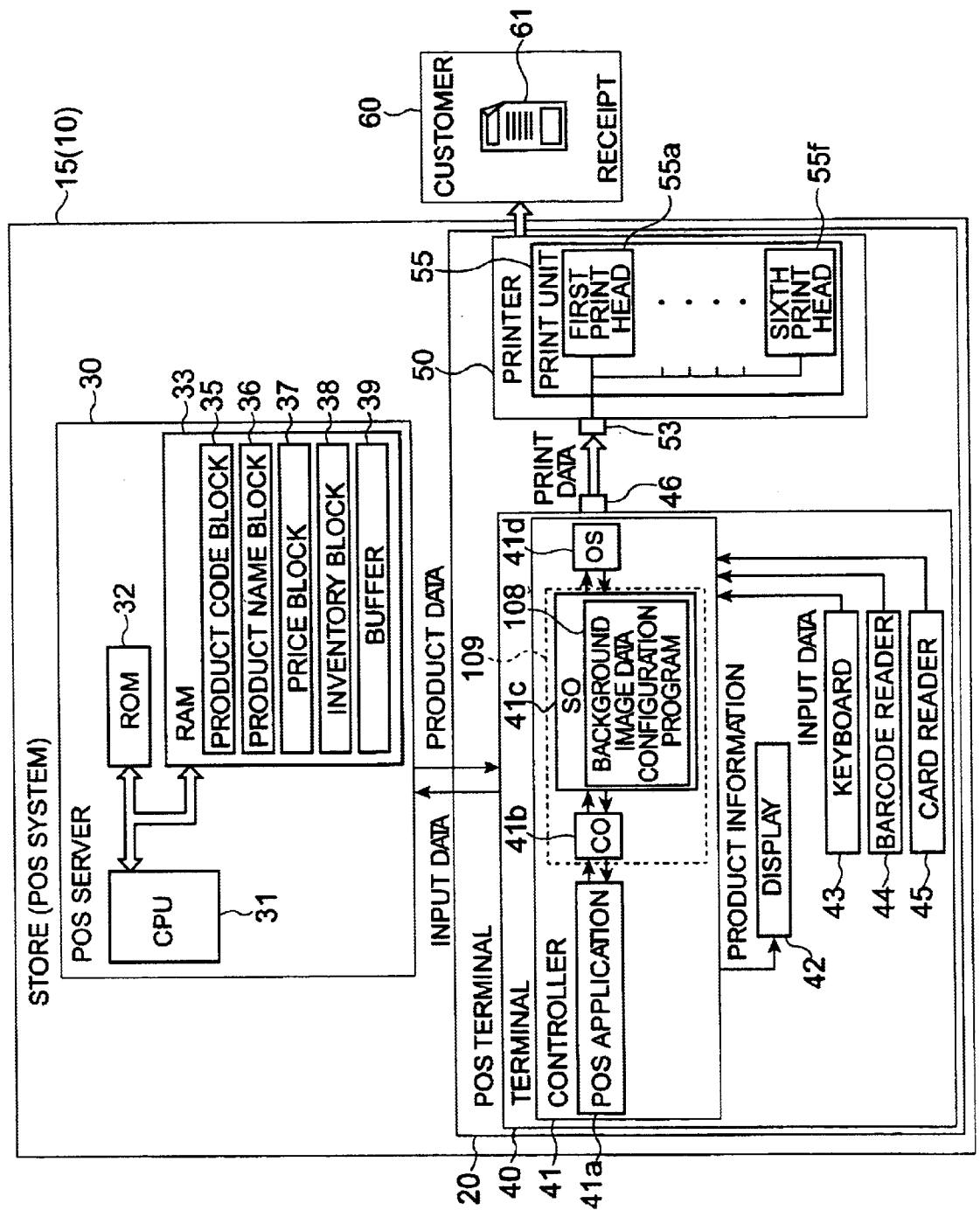
FIG. 1 is a schematic block diagram of a POS system, constructed according to embodiments of the present invention.

As shown in FIG. 1 a POS system 10 according to the present invention has multiple POS terminals 20 (only one is shown in the figure) for acquiring information about purchased merchandise primarily as a result of the operator (user) scanning the barcodes printed on each product with a barcode reader, and a POS server 30 connected to each of the POS terminals 20 for managing the input data entered at each POS terminal 20.

POS server 30 has a CPU 31, memory such as ROM 32 and RAM 33, and processes information stored in a buffer 39 in RAM 33 according to a control program stored in ROM 32. Product master records including product codes, product names, prices and inventory, represented by product code block 35, product name block 36, price block 37 and inventory block 38 respectively, are stored in RAM 33. Based on input data sent from the POS terminal 20, CPU 31 extracts the product code, product name, and price information from the master record, and generates payment transaction data, which is used for printing to a receipt 61 and presentation on the display 42 of the POS terminal 20.

This payment transaction data is the source from which the terminal 40 generates the print data, and includes the product name or code, price, and other product information to be printed to the receipt 61.

Each POS terminal 20 has a terminal 40 and printer 50 connected through connectors 46 and 53. The terminal 40 generates the print data for printing to the receipt 61 as part of the payment process based on the payment transaction data and input data received from the POS server 30. The printer 50 prints a receipt 61 based on this print data.

The input data acquired by the terminal 40 includes information about the customer 60 (customer information) and information about the products (product information). The input data can be entered via a keyboard 43, by scanning a barcode with a barcode reader 44, or by any other input method. A card reader 45 is also used to read customer credit cards and customer loyalty cards to acquire information for credit card purchases and customer information. Product information generated from the print data sent from POS server 30 is also displayed on the display 42 so that the customer 60 can confirm the purchased products and price information.

The terminal 40 is controlled by an OLE for Rental POS (below, "OPOS") printer driver that operates under an OS (operating system) such as the Microsoft Windows® operating system. OPOS provides the POS application 41a with a generic interface to the printer 50, barcode reader 44, and other peripheral devices. OPOS has a device control object (CO) 41b for each device category, and a service object (SO) 41c for each device model.

The POS application 41a generates print data for printing to a receipt 61 based on input data and print data sent from the POS server 30. The print data is passed to the printer CO 41b, and from there to the SO 41c for the printer model being used. The SO 41c processes this print data to produce print commands conforming to the command system of the particular printer, and sends the print commands through OS 41d to the printer 50. OPOS is provided to the user as a printer driver 109 combining SO 41c and CO 41b.

SO 41c includes a background image data configuration program 108 for setting the background image data. While described more specifically further below, the background image data configuration program 108 provides the user with an interface for setting the background image data by displaying a specific configuration screen (see FIG. 7 and FIG. 8) on the display 42. By thus providing the background image data configuration program 108 as part of the printer driver 109, the background image data can be set from the terminal 40 without modifying the POS application 41a running on the terminal 40.

The printer 50 is preferably an ink-jet printer having print unit 100 with, for example, six ink-jet heads 55, i.e., first print head 55a to sixth print head 55f. The six ink-jet heads 55 discharge, respectively, M (magenta), C (cyan), Y yellow), LM (light magenta), LC (light cyan), and K (black) to print full color images. The configuration of the print head unit 100 is not limited to this implementation. The number of print heads could be increased to print even more colors, or the number could be reduced to print only one or two colors.

The printer 50 can be set, using either DIP switches or memory switches, to a monochrome print mode that prints using only sixth print head 55f for black color or a color print mode that prints using all of the print heads. The terminal 40 can get this mode setting information to determine whether to include color information in the generated print data. Therefore, if the color print mode is set and the print data contains color information, the receipt 61 can be printed using two or more colors.

The printer 50 described below is set to the color print mode, the payment processing data including the product and price information is printed mostly in a primary color, specifically black (K), and the background image data is printed in one or more specific secondary colors other than the primary color.

Figure 2:
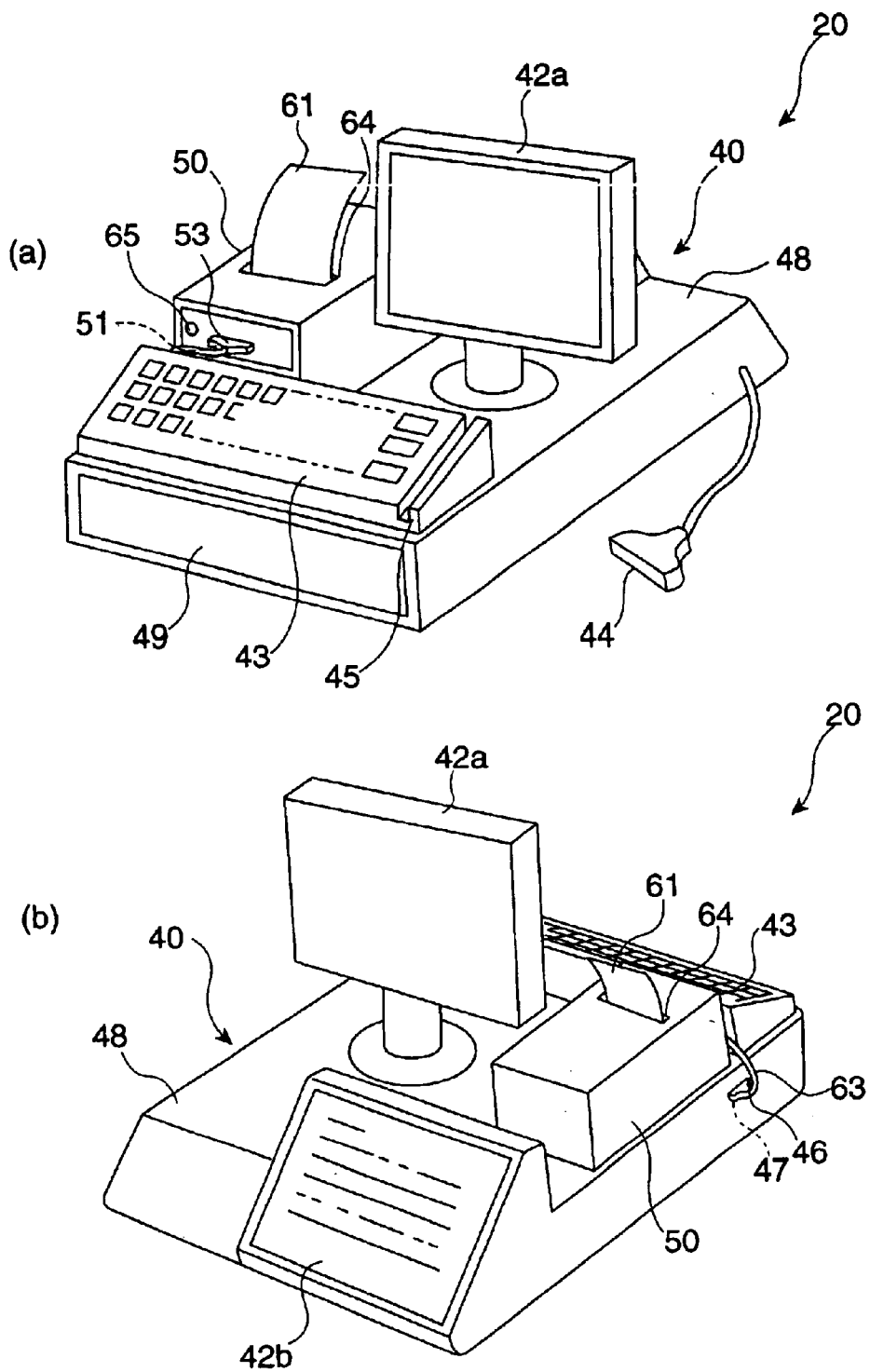
FIG. 2 is an external perspective view of a POS terminal in a POS system, constructed according to embodiments of this invention.

The configuration of the POS terminal 20 is described next with reference to FIG. 2, of which FIG. 2(a) is a front perspective view from the operator-side of the POS terminal 20, and FIG. 2(b) is a perspective view from the back, i.e., the customer's side. As will be understood from these figures, the POS terminal 20 has a terminal device 40 housed in a box-like main case 48, and a printer 50 at the back left side of the main case 48 as seen from the front. The printer 50 is connected to the main case 48 by a cable, and could be located anywhere allowed by the length of the cable.

The terminal 40 has a keyboard 43 at the top front of the main case 48 enabling the operator to enter product information and customer information, an operator display 42a behind the keyboard 43 to the right so that the operator can view and confirm the entered information, and a cash drawer 49 inside the main case 48. A barcode reader 44 for scanning product barcodes either preprinted or affixed to the product by labels is connected to the right side of the main case 48, and an interface 47 for connecting the printer 50 is connected to the left side of the main case 48. A card reader 45 for reading customer credit cards is also located to the right side of the keyboard 43.

A customer display 42b enabling the customer 60 to confirm the product information, for example, is provided on the back side of the main case 48.

The configuration screen for setting the background image data (see FIG. 7 and FIG. 8) is presented in the operator display 42a so that the operator can configure the background image while viewing it on screen.

The printer 50 also has an indicator 65 and printer interface 51 on the front. The printer interface 47 on the terminal 40 side and this printer interface 51 are connected through cable 63 and connectors 46, 53. A receipt exit 64 from which the printed receipt 61 is ejected is formed in the top of the printer 50.

Figure 3:
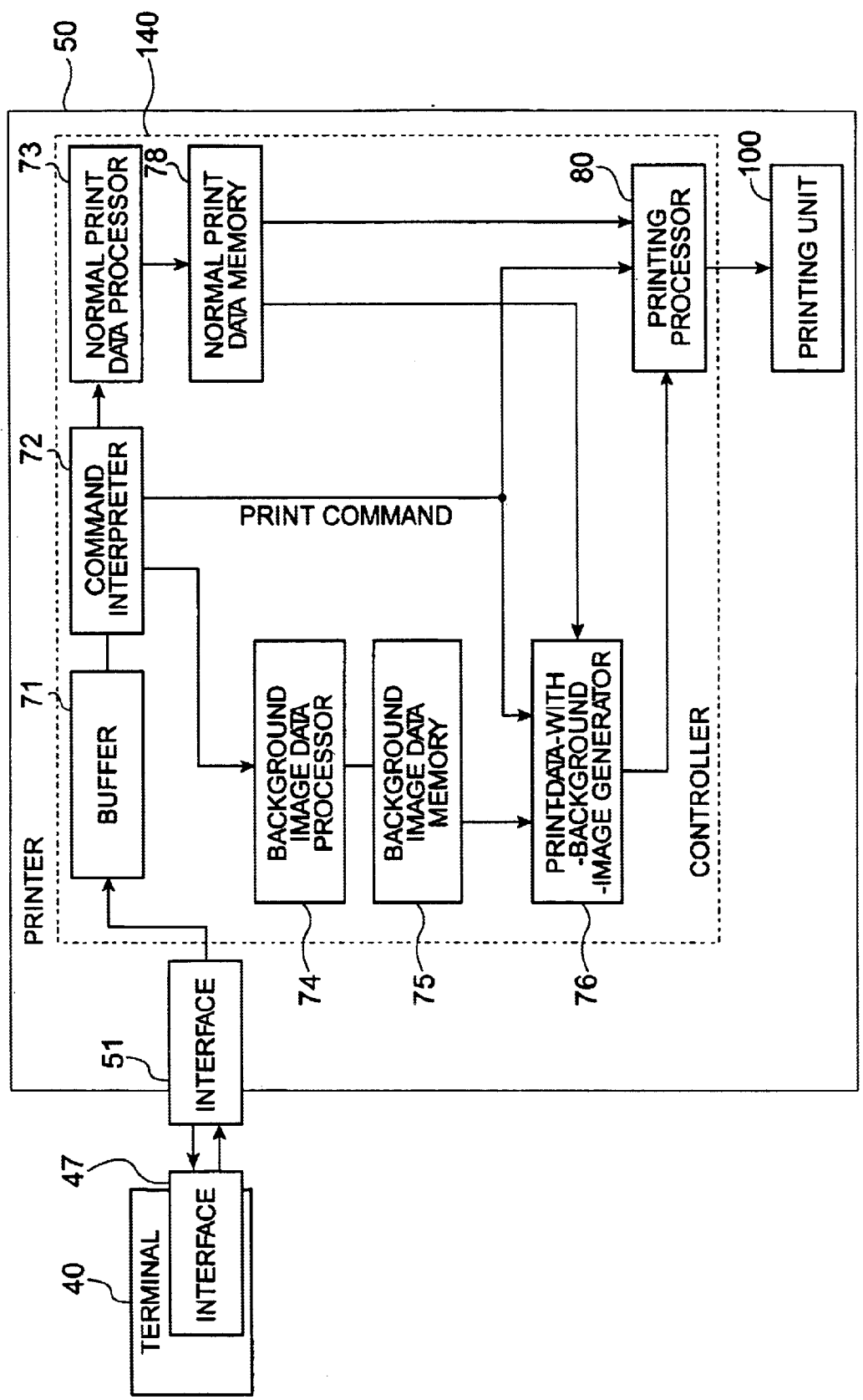
FIG. 3 is a function block diagram of a printer, constructed according to embodiments of this invention.

Control of the printer 50 is described next with reference to the function block diagram in FIG. 3. As shown in the figure, the controller 140 of the printer 50 gets normal print data for printing a receipt as part of a normal payment process, print commands, background image configuration commands, and other data from the terminal 40, and stores it to a receive buffer 71.

A command interpreter 72 analyzes data stored in the buffer 71 and directs data processing according to the command which is usually constituted of a command symbol(s), a parameter(s), and a body. If the data is a normal print command, the data including the command symbol, parameter and body, is passed to the normal print data processor 73. A normal print command is one for printing print data based on the payment transaction data, which may include, but is not limited to, text-based data and logo image data for a shop, to the receipt paper without a background image. If a background image configuration command is detected, the data including the command symbol, parameter and body is passed to the background image data processor 74. If print a command for printing print data with background image data is detected, the data is passed to the print-data-with-background-image generator 76.

The background image data processor 74 generates a specific background image as more fully described below, and stores it to the background image data memory 75.

The normal print data processor 73 generates and stores the print data to the normal print data memory 78.

If a parameter for adding a background image to the print data is set in 10 the detected print command, the data stored in the normal print data memory 78 is combined with the specific background image data selected from the data stored in background image data memory 75 to generate print data with an embedded background image, and sends the combined print data and background image to the printing processor 80.

If the parameter adding a background image to print data is not set in the print command, the printing processor 80 passes the data in normal print data memory 78 directly to printing unit 100 for printing.

The printing processor 80 thus selectively gets data according to the print command type, and sends it to the printing unit 100.

Figure 9:
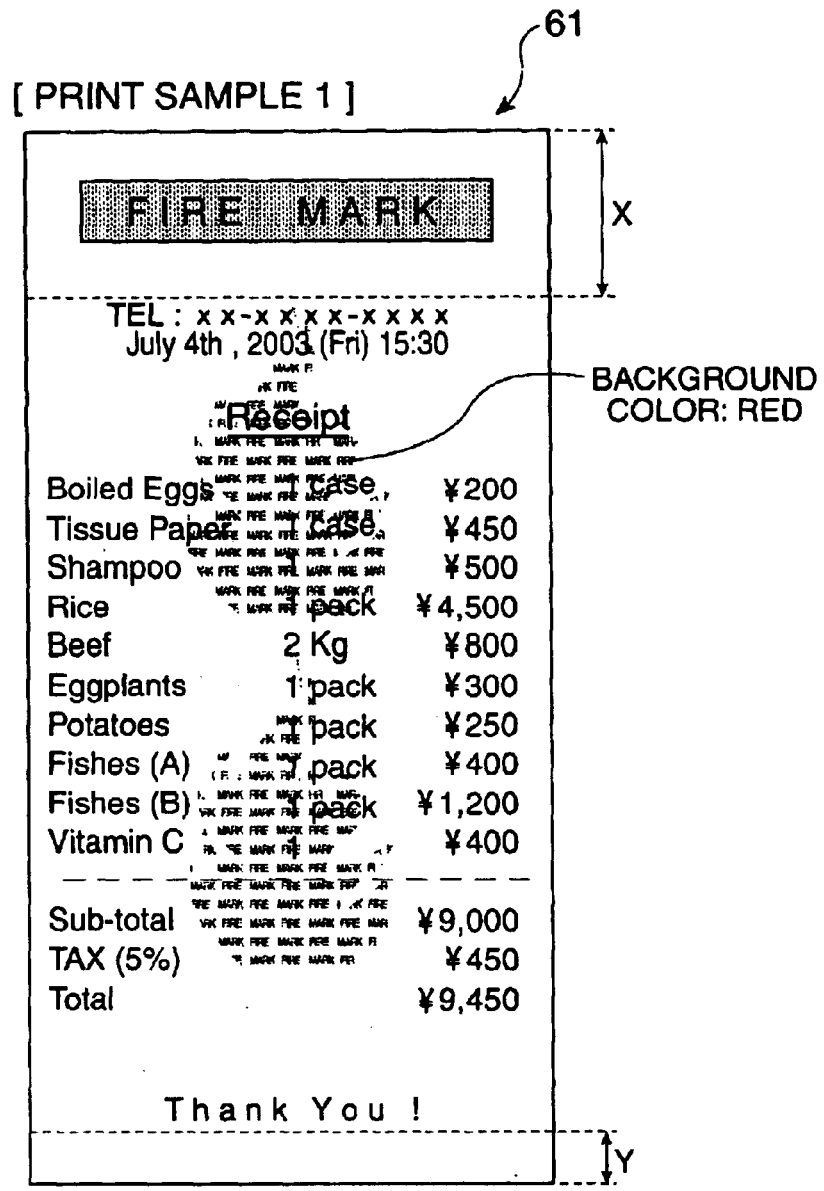
FIG. 9 shows an example of a receipt (print sample 1) produced by the printing method of the present invention.

This operation is achieved primarily using a CPU, ROM, and RAM (described in detail below). Thus, when the terminal 40 indicates printing with a background image, print data with an embedded background image is generated and can be printed by printing unit 100. Note that one example of a receipt 61 printed with a background image is shown in FIG. 9.

Figure 4:
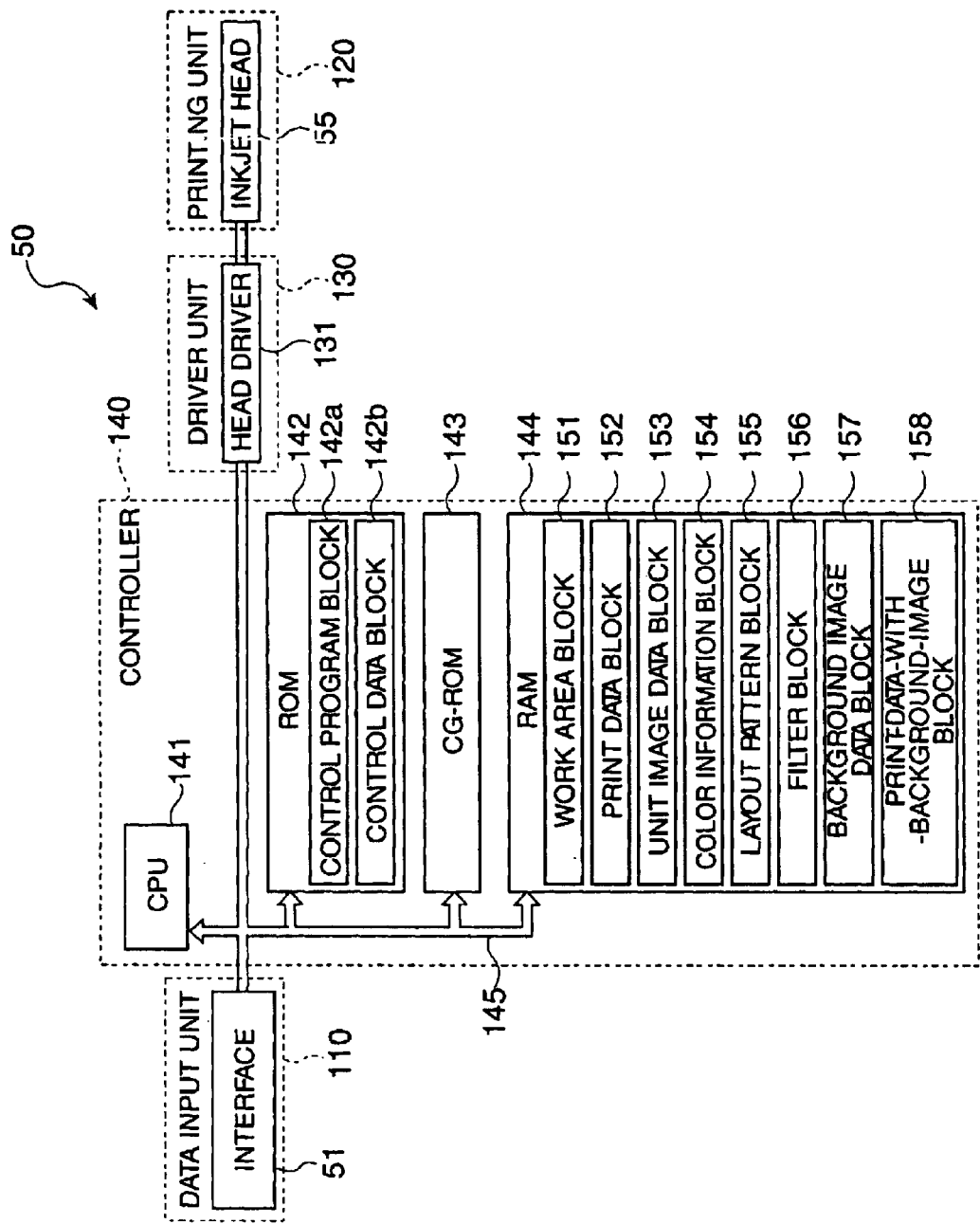
FIG. 4 is a control block diagram of a printer, constructed according to embodiments of this invention.

FIG. 4 is a control block diagram of the printer 50. As shown in the figure, the printer 50 has a data input unit 110 with a printer interface 51 for fetching a print command, print data, a background image configuration command, background image data, etc. from the terminal 40, a print unit 100 with six inkjet heads 55 for color printing by discharging different colors of ink from the different ink-jet heads 55, a driver unit 130 with head drivers 131 for driving the inkjet heads 55, and a controller 140 providing overall control of the printer 50.

The controller 140 includes a CPU 141, ROM 142, CG-ROM 143, and RAM 144 interconnected through an internal bus 145. ROM 142 has a control program block 142a for storing the control program run by CPU 141, and a control data block 142b for storing control data, including various tables. CG-ROM 143 stores font data for the printed characters, and outputs font data specified by input character codes.

The working area of RAM 144 used for the control process includes various work area blocks 151 used for storing flags, for example: a print data block 152 for storing print data sent from the terminal 40; a unit image data block 153 for storing multiple image data units representing the image units that are used to build a background image; a color information block 154 for storing information relating to the background image print colors; a layout pattern block 155 for storing multiple layout patterns for setting the locations of the unit images; a filter block 156 for storing multiple filters for filtering the multiple arranged unit images; a background image data block 157 for storing the generated background image data; and a print-data-with-background-image block 158 for storing the print-data-with-background-image generated by adding background image data to the print data. RAM 144 is also backed up so that the stored data is saved even if the power is turned off.

The internal bus 145 is also connected to data input unit 110 and driver unit 130, takes input data (including background image configuration commands and print data) from the printer interface 51 (see FIG. 3), and outputs the output data from the CPU 141 (such as print-data-with-background-image) and control signals to the driver unit 130 (printer driver 131).

By taking control signals and data from the different parts of printer 50, processing data in RAM 144, and outputting signals and data to the other parts based on the control program stored in ROM 142, CPU 141 controls overall operation of the printer 50, including configuring the background image data, generating background image data according to the image data configuration, and generating print-data-with-background-image based on the payment process data and background image data.

The printer interface 51 and the printer interface 47 disposed in the terminal 40 (see FIG. 3) could, for example, operate using serial data transfers based on the RS-232C standard, parallel data transfers based on the Centronics standard, a network connection such as 10Base-T Ethernet®, or another data transfer standard such as USB.

Figure 5:
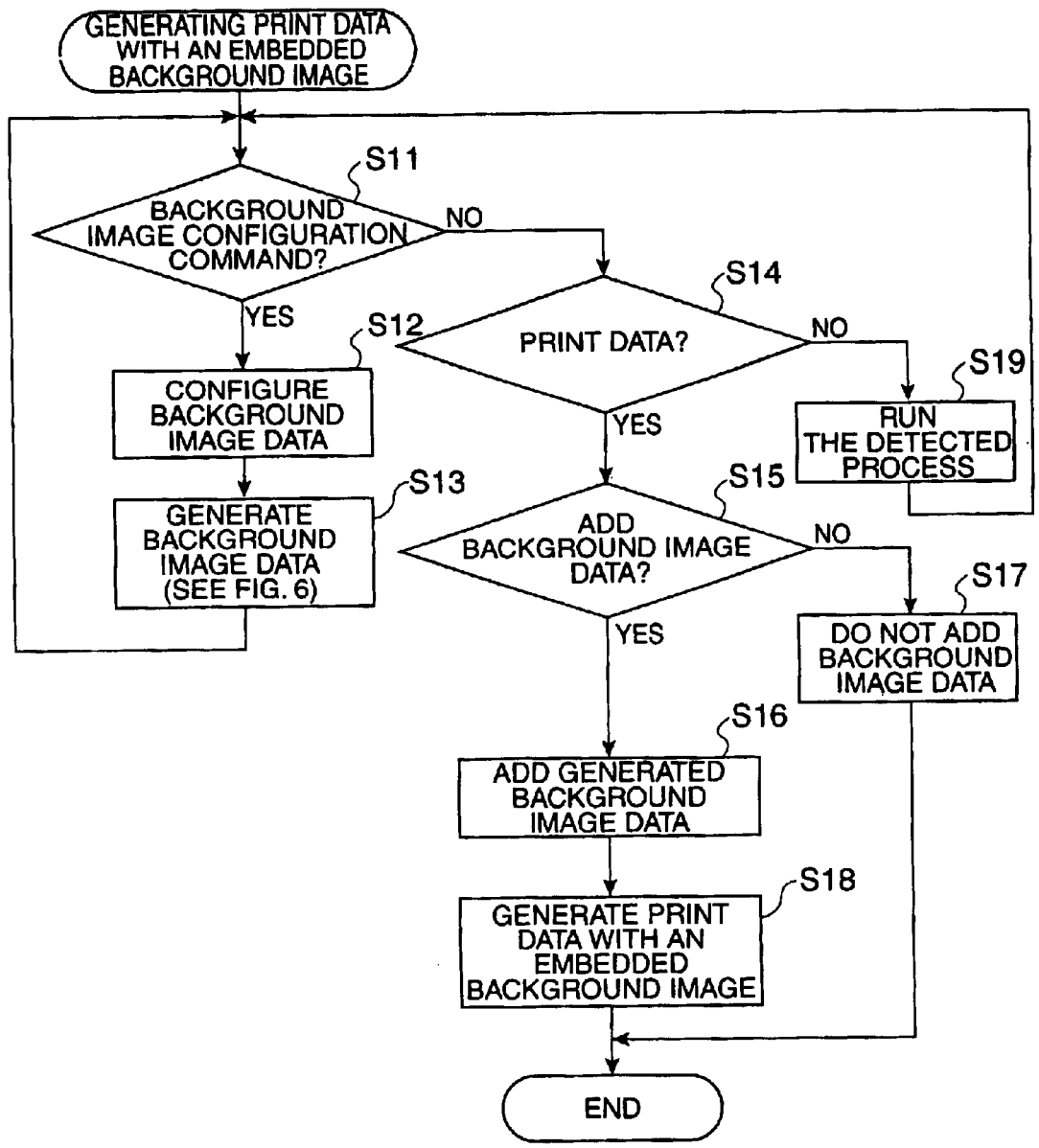
FIG. 5 is a flow chart of a process for generating print data with an embedded background image, according to embodiments of this invention.
Figure 6:
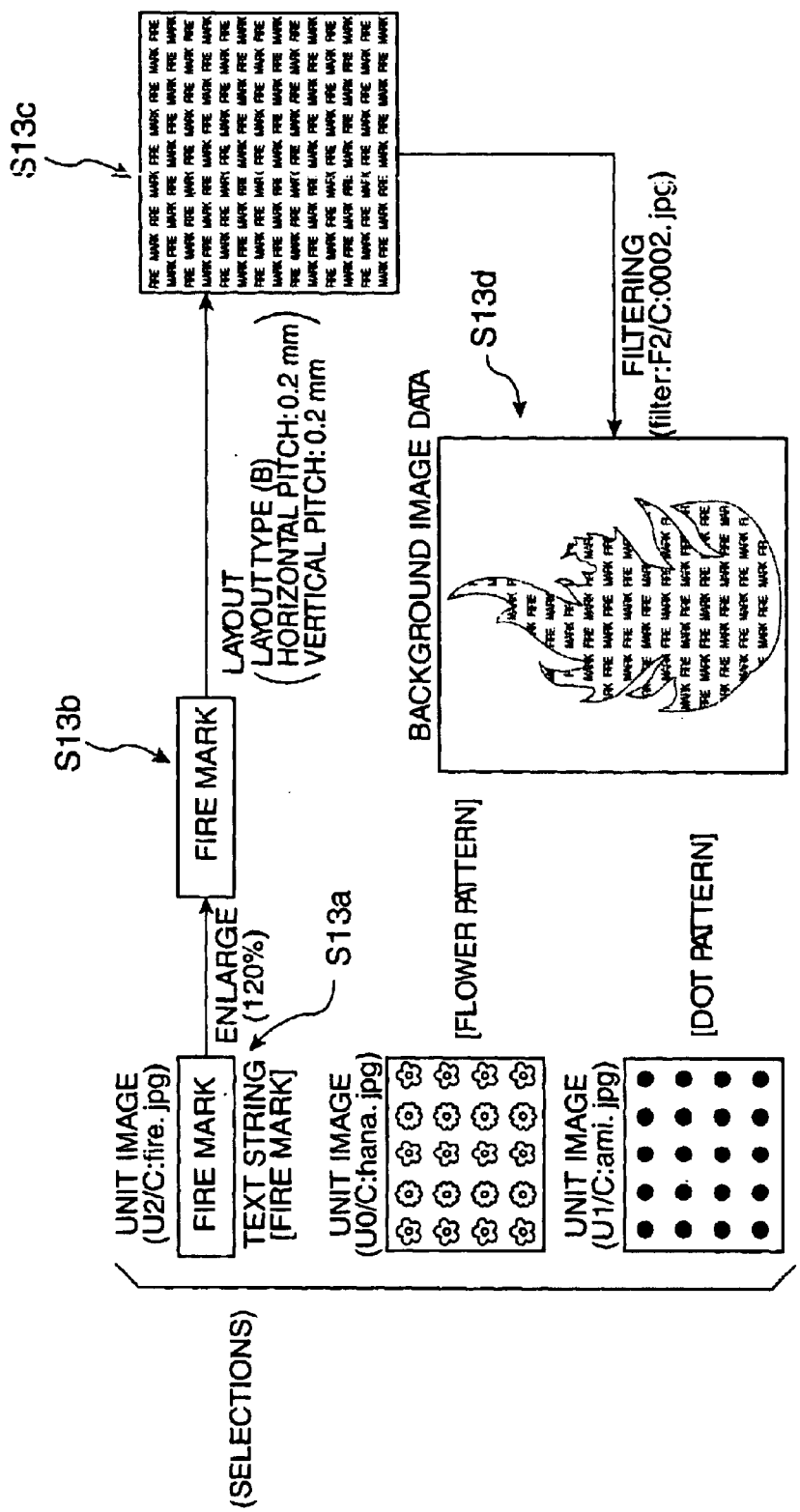
FIG. 6 shows an example of the background image data generating process.

A process according to the present invention for generating print data with an embedded background image that is run by the background image data processor 74 of the printer 50 is described below with reference to the flow chart in FIG. 5, and a further illustration of this process is shown in FIG. 6.

When input data is received the command interpreter 72 of the printer 50 first determines if a background image configuration command was received (S11). If a background image configuration command was received (S11 returns yes), parameters for generating the background image data are set and the background image data is generated (S12).

The background image generating parameters are set by the terminal 40 running background image data configuration program 108 (see FIG. 1). This is described in detail below, and the background image data generation process (S13) is described briefly here with reference to FIG. 6.

As shown in FIG. 6, the image selected (S13a) in the configuration screen includes one of several "unit images." The selected unit image is first enlarged according to the parameter settings (S13b). This enlarging process spreads the image over multiple columns widthwise to the receipt based on the width of the receipt 61 paper (the horizontal direction as shown in the figures) and multiple rows in the feed direction of the receipt 61 (the longitudinal direction as shown in the figures) so that the image has a specific length (S13c). This length is variable according to the size of the image filter that will be applied. The unit image is then filtered using the filter image to determine where the unit image is printed, thereby generating the background image data (S13d). For example, if the image filter is the outline of a flame as shown in FIG. 6, the outline of the flame determines the boundary of the area where the unit image is printed.

Once the background image data is generated as described above (S13), the background image data is stored in the background image data block 157 (see FIG. 4). A process is then applied to add the background image data to print data received from a payment process.

If the input data is not a background image configuration command (S11 returns no) and is print data from a normal payment process (S14 returns yes), it is determined whether background image data is to be added (S15). If a background image is to be added to the print data (S15 returns yes), previously generated background image data is added to the print data (S16) to produce print data with an embedded background image (watermark) (S18). However, if adding a background image is not indicated (S15 returns no), background image data is not added (S17) and the print data received from the terminal 40 is the final print data.

If the input data is neither a background image configuration command (S11 returns no) or print data (S14 returns no, such as when data for storing background image data is received), the process indicated by the input data is run (S19).

As shown in FIG. 9, the area to which the background image data is added to print data received from a payment process can be specified as extending from the print line a specific length X from the leading edge of the receipt 61 to a line at a specific distance Y from the trailing edge of the receipt 61, or as from the line where a specific character string in the print data (such as the telephone number of the store) is printed to the line where another specific character string is printed (such as "Thank You") at the bottom of the receipt. This enables placing the background image in a specific area of the receipt 61 so that an attractive, legible receipt 61 can be printed.

The process run by the background image data configuration program 108 for setting the background image data parameters is described with reference to the configuration screens D11 to D15 shown in FIG. 7 and FIG. 8.

When the background image data configuration program starts the settings for the current background image data are first displayed in the configuration screen. The operator sets the parameters for new background image data by simply changing the parameters from these settings. These new parameters can simply overwrite the currently registered background image data parameters, or a new ID could be assigned to register different parameters for each ID so that the background image can be easily changed according to the application.

As shown in FIG. 7 information for setting the background image can be divided between multiple configuration screens so that the operator (user) can open the screen needed to set specific parameters. Note that the configuration screen accessed by the first tab, basic, sets such parameters as the width of the receipt 61, background image print density and print quality, and is substantially the same in content as a standard printing configuration utility. Further description thereof is thus omitted here.

FIG. 7(a) is the screen (D11) for setting the unit image parameters. The operator selects a desired file from a listing 201 of pre-registered files to specify the unit image file shown in the file selection box 202. The operator could also select the ID of a pre-registered file in the ID box 203 to define the file storing the parameter configurations.

Figure 10:
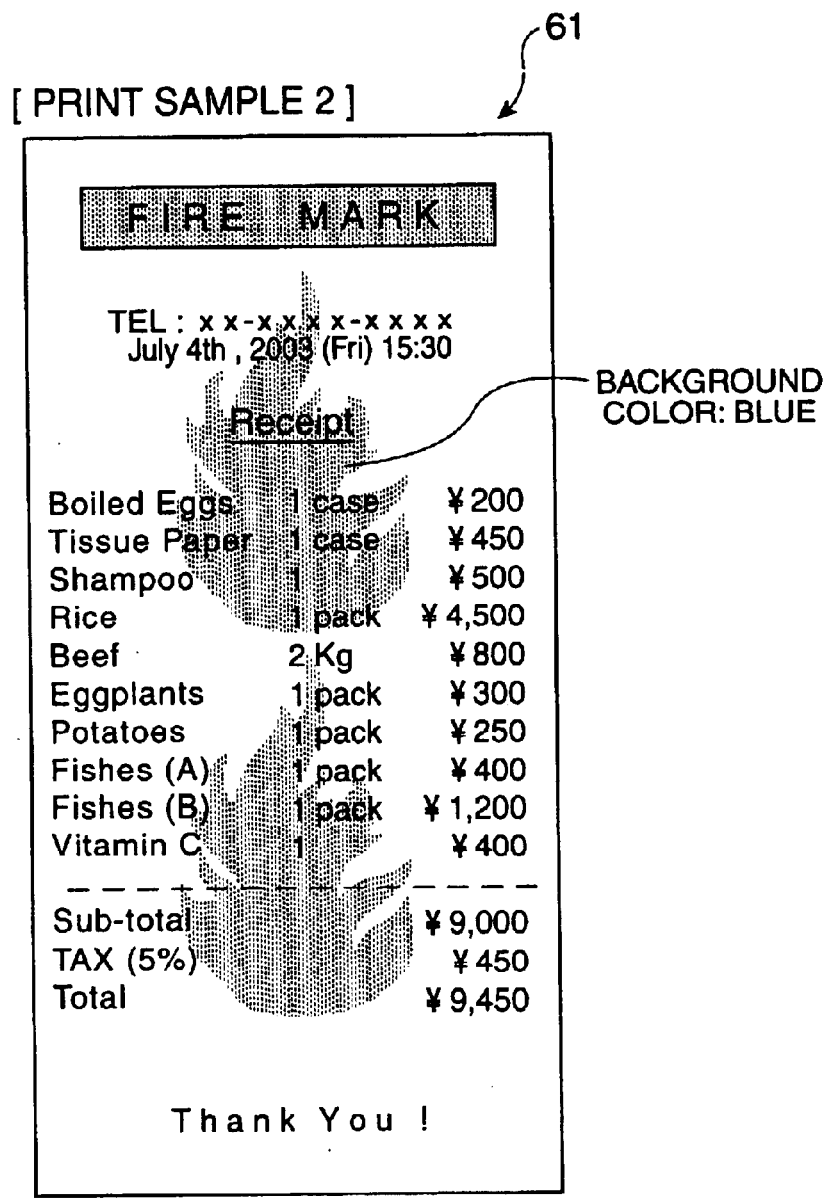
FIG. 10 shows an example of a receipt (print sample 2) produced by the printing method of the present invention.

Note that in this example the unit image in the first print sample in FIG. 9 is an image representing the character string FIRE MARK shown (see S13a in FIG. 6), and in the case of print sample 2 shown in FIG. 10 is an image representing a pattern of dots.

The enlargement ratio box 204 in configuration screen D11 sets the enlargement ratio for the unit image, and the enlargement process enlarges the unit image by the same ratio in both the width and length directions of the receipt 61. The enlargement is 120% for print sample 1 shown in FIG. 9, for example, and is 180% for print sample 3 shown in FIG. 11.

When the above settings are completed and the operator clicks the OK button 205, the unit image settings are stored in RAM or other storage in terminal 40.

The configuration screen D12 shown in FIG. 7(b) is for configuring color printing. If color printing is enabled by selecting "YES," the color used to print the background image is set in the background color selection box 211.

In this example print data for the names of purchased products and their prices is printed in the primary color (black (K)), and the background image color can therefore be set to a secondary color, that is, a color other than black. If the printer can print only two colors, black (K) and red (R) in this example, the background image is necessarily printed in red. By thus printing the main print data in a primary color and the background image data in a secondary color, a background image can be added to the print data without impairing the readability of text printed from the print data.

When the above settings are completed and the operator clicks the OK button 212, the settings for color printing are stored in RAM or other storage in terminal 40.

A configuration screen D13 for the layout pattern is shown in FIG. 7(c). In this example the user first selects the desired layout from choices (A) to (C). Whether the layout pitch (the distance between adjacent unit images in the layout) is also set is then determined. If the layout pitch is user-defined, the user can then enter numeric values for the desired pitch in the widthwise direction (the horizontal direction for print sample 1 shown in FIG. 9) and the feed direction (the longitudinal direction for print sample 1 in FIG. 9) of the receipt 61 in the layout pitch definition boxes 221.

If the user selects "DEFAULT SETTINGS" for the layout pitch, the pitch can be set by default to 0.

When these settings are complete and the operator clicks the OK button 222, the layout pattern settings are stored in RAM or other storage in terminal 40.

The filter configuration screen D14 is shown in FIG. 8(a). The first choice in this screen is whether to apply an image filter or not. If "APPLY" is selected, a filter file is selected from a listing of existing filter files 231, and the selected file is entered in file box 232. The filter can be defined not only by an image data file but also by an algorithm or a functional expression representing a shape such as a circle, a square, a triangle, etc. The operator could also select the ID of a previously registered filter to specify the file. In print sample 1 in FIG. 9 and print sample 2 in FIG. 10 this filter specifies the image of a flame, and the outline of the selected filter (flame) determines the area in which the unit image is arrayed.

When these settings are complete and the operator clicks the OK button 234, the filter settings are stored in RAM or other storage in terminal 40.

Further configuration details are entered in the More screen D15 shown in FIG. 8(b) accessed by clicking the More tab. The first choice is whether to add a background image to the print data. If "DO NOT ADD" is selected, the background image data is not added to the print data regardless of the above settings, and only the print data is printed to the receipt 61 (see FIG. 14). The Add button 242 and Delete button 243 beside the unit image file listing 241 can be clicked to respectively register new unit image data or delete a unit image. Likewise, the Add button 245 and Delete button 246 beside the filter listing 244 can be clicked to respectively register a new filter file or delete an existing filter file.

When these settings are complete and the operator clicks the OK button 247, information for these settings are stored in RAM or other storage in terminal 40.

Figure 8:
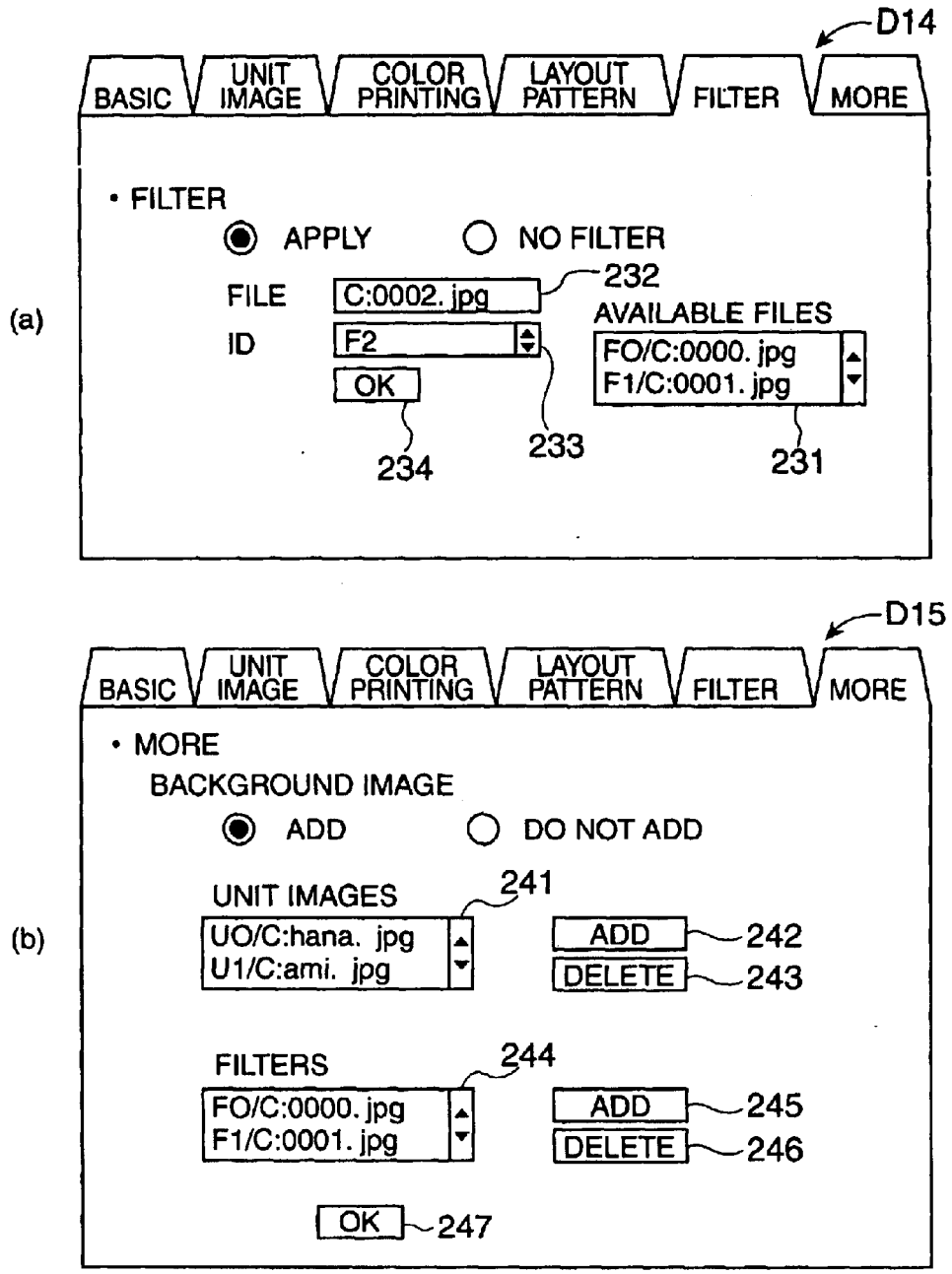
FIG. 8 shows sample configuration screens for configuring background image data, according to embodiments of this invention.

When the settings shown in FIG. 7 and FIG. 8 are all completed and the operator clicks a Save Settings button not shown to save the background image data settings, the set parameters (i.e., the data stored in RAM or other memory in terminal 40 as noted above) are sent from terminal 40 to printer 50 as a background image configuration command.

The printer 50 then stores these background image data generation parameters in the background image configuration command to the unit image data block 153, color information block 154, layout pattern block 155, and filter block 156 in memory.

After the parameters are stored, the printer 50 generates a background image and saves the image to the background image data block 157 [155, sic]. This process for generating a background image can be run when print data with an embedded background image is received.

If the print command sent from the terminal 40 contains a parameter indicating adding a specific background image, print data with an embedded background image is produced by adding the specified background image to normal print data.

Parameters for generating a background image are preferably stored in nonvolatile memory such as EEPROM. By thus storing the parameter settings in the printer, the same image can later be printed without sending the background image data to the printer every time a receipt is printed. The parameters can also be recalled into working memory so that the same background image can be printed if the printer is turned off.

Other examples of background image printing are described next.

Print sample 2 shown in FIG. 10 has a dotted pattern selected as the unit image with the background image color set to blue. Other settings are the same as print sample 1 shown in FIG. 9.

Print sample 3 shown in FIG. 11 has the enlargement factor for the unit image FIRE MARK set to 180%, layout pattern A selected, and filtering turned off.

Another variation is to change the order in which the background image data shown in FIG. 6 is produced. In print sample 4 shown in FIG. 12, for example, the dotted pattern is selected as the unit image, this is filtered using the fire pattern filter, and the filtered result is then reduced using a 20% enlargement ratio. The resulting image is then arranged widthwise and in the feed direction of the receipt 61 using layout pattern (A) to achieve print sample 4.

More specifically, the samples shown in FIGS. 9–11 are generated by producing the background image data in the following sequence: (1) enlarging the unit image, (2) multiplying and arranging the unit images in the width and length directions of the form, and (3) applying the filter (see FIG. 6). The print sample in FIG. 12, however, is obtained by producing the background image data in the following sequence: (1) filtering the unit image, (2) reducing the filtered unit image, (3) arranging the result in the width and length directions of the form.

Changing the order of the background image data generation process is thus within the scope of this invention. It will also be apparent that the content of the configuration screens shown in FIGS. 7 and 8 can be changed appropriately. Therefore, while the content of the configuration screens shown in FIGS. 7 and 8 will change in part to produce background image data such as shown in print sample 4 in FIG. 12, further description of those screens is omitted.

Figure 12:
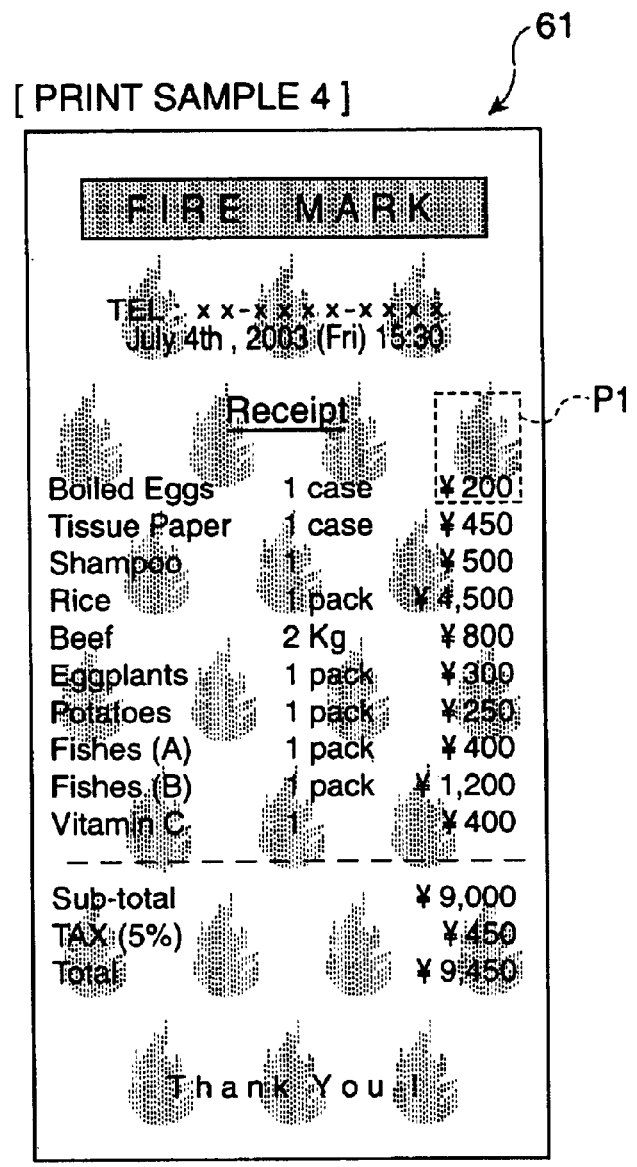
FIG. 12 shows an example of a receipt (print sample 4) produced by the printing method of the present invention.

If an image (P1) using, a dotted pattern to represent a flame is registered as the unit image in the case shown in FIG. 12, print sample 4 can be achieved without changing the configuration screens shown in FIGS. 7 and 8.

By storing data representing multiple unit images, layout patterns, and filters, the present invention enables the operator to easily configure the background image data by simply selecting the desired background image settings from among the available choices. Furthermore, because the enlargement factor of the unit image, filtering, layout pattern, background color, and other settings can be changed, a wide variety of background image data can be generated even when there are only a few unit images from which the background image data is produced.

When a printer 50 according to the present invention is used in a POS system 10 as in this preferred embodiment of the invention, the store logo, for example, can be stored as the unit image. This makes it possible to print receipts 61 featuring different background images designed to incorporate the store logo in various ways.

More specifically, by providing memory with capacity sufficient to store a small unit image (logo) in a printer 50 used as a receipt printer, the sales receipts printed and given to each customer can be made more distinctive and used as an effective advertising tool.

Furthermore, because the controller 140 inside the printer 50 generates the background image data, color graphic-based print data (i.e., the print data with an embedded background image) can be generated even when the POS application 41a run by the terminal 40 is a monochrome, text-based application.

Figure 13:
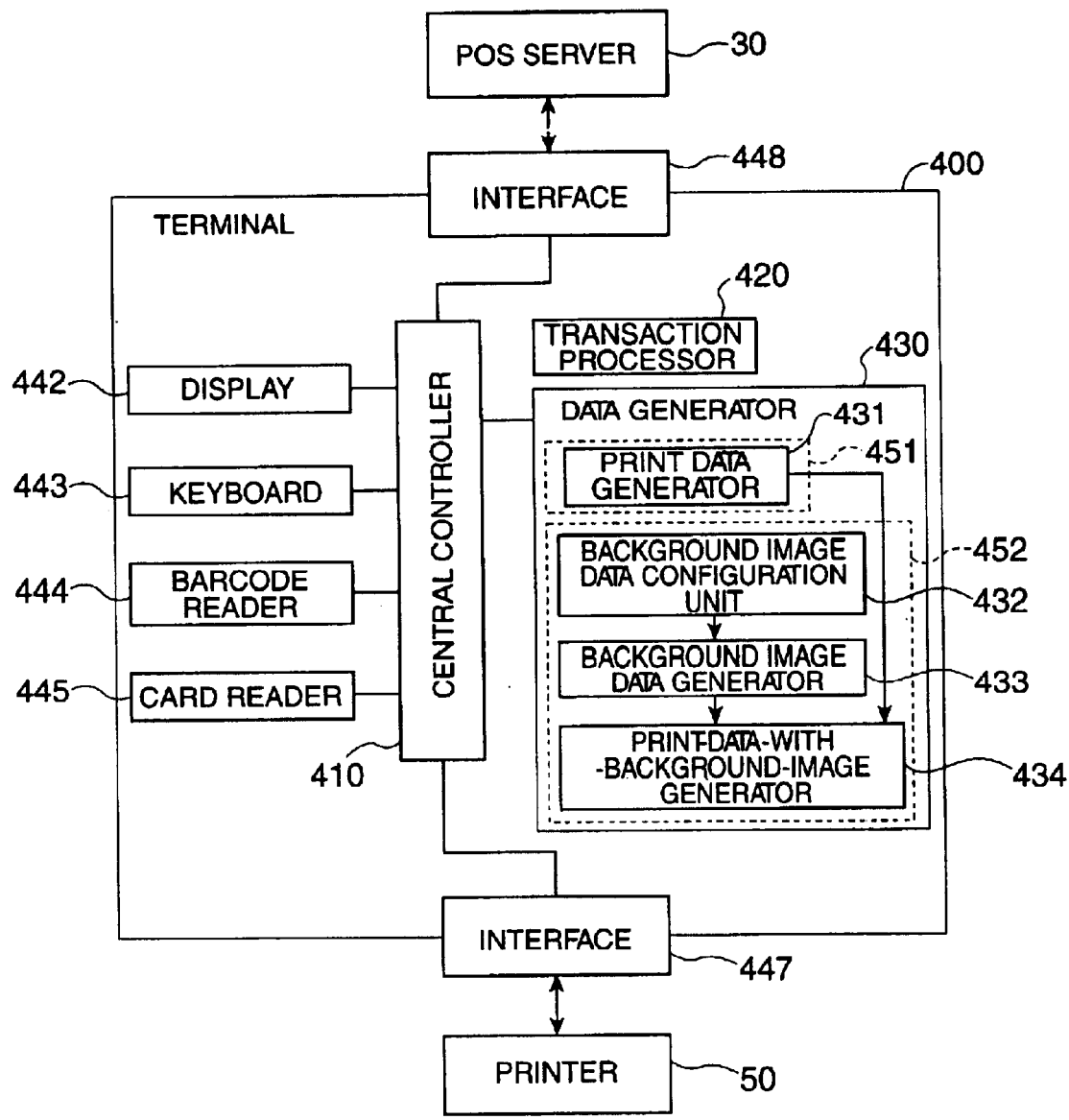
FIG. 13 is a functional block diagram of a terminal device according to embodiments of the present invention.

Another embodiment of the present invention is described next in connection with FIG. 13. The controller 140 of the printer 50 generates the background image data in the embodiment described above. In the embodiment of FIG. 13, the printer driver 452 embedded in the terminal 400 generates the background image data. The following description focuses on the differences between the above-described embodiment and this alternate embodiment of the invention.

As shown in FIG. 13 the terminal device 400 has a display 442, keyboard 443, barcode reader 444, card reader 445, interface 447, interface 448, transaction processor 420, data generator 430, and central controller 410.

The display 442 displays the name and price of purchased merchandise during the transaction process, and displays the configuration screens when configuring the background image data. The keyboard 443 is used to enter product codes, amounts, and information for configuring the background image data. The barcode reader 444 is used to read product barcodes during the transaction process, and the card reader 445 is used to read customer credit card information and customer loyalty card information, for example, during the transaction process.

The interface 448 handles data input/output with the POS server 30, and interface 447 handles data I/O with the printer 50. The transaction processor 420 runs transaction processes including registering products and processing payments. The data generator 430 primarily generates the print data, and central controller 410 has a CPU, memory such as RAM and ROM, and controls overall operation of the terminal 400.

The data generator 430 has a print data generator 431, background image data configuration unit 432, background image data generator 433, and print-data-with-background-image generator 434.

The print data generator 431 generates print data based on information processed by the transaction processor 420 and data sent from the POS server 30.

The background image data configuration unit 432 controls the various background image data settings. The background image data generator 433 then generates the background image data according to the settings acquired from the background image data configuration unit 432.

The print-data-with-background-image generator 434 then generates the print data with an embedded background image based on the background image data from the background image data generator 433 and the print data from the print data generator 431.

It should be noted that the print data generator 431 is part of the POS application 451, and the background image data configuration unit 432, background image data generator 433, and print-data-with-background-image generator 434 are part of the printer driver 452.

The background image data configuration unit 432 also has a configuration program for configuring the background image data. This configuration program is equivalent to the background image data configuration program 108 of the first embodiment (see FIG. 1).

The printer driver 452 sends print data (print data with an embedded background image) and receives control signals from the printer 50 through interface 447.

The background image data configuration unit 432, background image data generator 433, and print-data-with-background-image generator 434 in the printer driver 452 run the same processes as the controller 140 of the printer 50 in the above first embodiment, and further description thereof is thus omitted here.

With this second embodiment of the invention the printer driver 452 can generate color graphic-based print data (print data with an embedded background image) without modifying the POS application 451 run by the terminal 400 even when the POS application 451 is a monochrome, text-based application.

Either the controller 140 of the printer 50 or the printer driver 452 embedded in the terminal 400 generates the background image data and print data with an embedded background image in the first and second embodiments of this invention. It will also be apparent, however, that by storing a background image data generating program and a program for generating print data with an embedded background image to a storage medium, these programs can be easily transferred for use by another printer or terminal device. Any computer-readable storage medium can be used as the recording medium, including a hard disk drive, flash ROM, a memory card device (e.g., Compact Flash, smart media, or memory stick), a Compact Disc (CD), a magneto-optical disc, a Digital Versatile Disc (DVD), or a floppy disk. The medium may also be an electromagnetic signal such as a carrier wave on which the program is embodied.

It will also be apparent that the POS application 41a of the terminal 40 could be configured to generate the background image data and print data with an embedded background image.

As described above the printing method and program for achieving this printing method, printer, printer driver, POS terminal, and POS system according to the present invention can acquire print data generated by a terminal device 40 and produce print data with an embedded background image in the printer 50 by combining this print data to background image data representing a desired background image. The present invention can therefore be used to print color graphic-based receipts 61 without changing the application run by the terminal 40 even if the terminal application is a monochrome, text-based application.

Furthermore, because the print data with an embedded background image is produced on the printer 50 side in the present invention, a low speed interface can be used between the terminal 40 and printer 50 because the speed of data transfers from the terminal 40 to the printer 50 is not a problem.

Yet further, because it is not necessary to change the printer driver, color graphic-based receipts 61 can be printed and issued with minimal capital investment.

Furthermore, because the background image data is generated by laying out plural background images and filtering the result, a wide range of background images can be easily and efficiently generated even when little storage capacity is available for storing the background image data.

Furthermore, because the printer driver 109 generates the configuration commands for configuring the print data with an embedded background image, the background image data can be configured from the terminal 40 without directly operating the printer 50 and without changing the terminal 400 application even if it is a monochrome, text-based application.

Furthermore, when the print data with an embedded background image is generated by the printer driver 452 embedded in the terminal 400 (as described in the second embodiment), the printer 50 can print color graphic-based receipts without changing the monochrome, text-based POS application 451 run by the terminal 400.

The above embodiments have been described as having the print data preset for printing in the primary color (black (K) in these examples) and the background image printed in a printable color other than black (secondary color), but the background image could also be set to print black (K). In this case (that is, the print data and background image being printed using the same color), however, the background image is preferably set so that it is automatically printed at a lower print density. This enables adding a background image printed in the same color without impairing the readability of text and other information printed based on the print data.

Rather than controlling only the color of the background image, the present invention can also be configured so that the color of the print data can also be changed. To avoid impairing the readability of information printed based on the print data in this case, the printed color of the background image can preferably only be set to a color other than the color used to print the print data, or if the background image and print data can be printed using the same color, the background image is preferably set so that it is automatically printed at a lower print density.

Furthermore, the unit image enlargement factor is user-definable and the unit image is enlarged by the same ratio in both the width and feed directions of the receipt 61 in these examples. It is also obviously possible to set a different enlargement factor for the width and feed directions so that an even greater variety of background image data can be generated.

In addition, the background image data settings is not limited to the content shown in FIG. 7 and FIG. 8. Other possible settings include setting an angle of rotation for the unit image, and specifying two or more unit images and respective layout patterns and filter enlargement ratios. This configuration enables generating an even greater variety of background image data.

An ink-jet printer is used by way of example as the printer 50 in the above embodiments, but the invention is not limited to ink-jet printers. The techniques of the invention can also be used with thermal head printers and wire dot printers, for example.

The invention is also not limited to POS systems. Rather, the system configuration and device configuration can be varied in many ways without departing from the scope of the accompanying claims.

A printing method, a program for achieving this printing method, a recording medium for storing the program, a printer, a printer driver, a POS terminal, and a POS system according to the present invention can print color graphic-based receipts from a printer without changing the host computer application even when the host computer runs a monochrome, text-based application.

While the invention has been described in conjunction with preferred embodiments thereof, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A printing method for processing print data generated by a host computer, the printing method comprising:

acquiring the print data from the host computer;

selecting a unit image to be used as a component of a background image;

laying out multiple copies of the selected unit image in a selected layout pattern;

selecting a filter for delineating an image area of the selected layout pattern or each copy in the layout pattern;

filtering the selected layout pattern or each copy in the layout pattern using the selected filter to determine where the copies of the selected unit image are to be printed to produce the background image data;

adding the background image data to the print data to produce print data with an embedded background image; and printing the print data with the embedded background image on receipt paper.

2. A printing method as described in claim 1, further comprising receiving from the host computer a configuration command containing configuration parameters for producing the background image, processing the selected unit image according to the configuration parameters to generate the background image data, and based thereon producing the print data with the embedded background image.

3. A printing method as described in claim 2, wherein the configuration command contains information specifying a print color for the background image.

4. A printing method as described in claim 2, wherein the configuration command contains information specifying a data file of the selected unit image.

5. A printing method as described in claim 2, wherein the configuration command contains information specifying a data file of the selected filter.

6. A printing method as described in claim 2, wherein the configuration command contains information specifying an enlargement factor of the selected unit image.

7. A printing method as described in claim 2, wherein the configuration command contains information specifying the selected layout pattern for arranging the selected unit image.

8. A printing method as described in claim 2, wherein the configuration command contains information specifying a layout pitch of the selected unit image.

9. A printing method as described in claim 2, wherein the configuration command is generated by a printer driver embedded in the host computer.

10. A computer-readable medium embodying a printing program for processing print data, the program comprising:

instructions for acquiring the print data from the host computer;

instructions for selecting a unit image to be used as a component of a background image;

instructions for laying out multiple copies of the selected unit image in a selected layout pattern;

instructions for selecting a filter for delineating an image area of the selected layout pattern or each copy in the layout pattern;

instructions for filtering the selected layout pattern or each copy in the layout pattern using the selected filter to determine where the copies of the selected unit image are to be printed to produce the background image data;

instructions for adding the background image data to the print data to produce print data with an embedded background image; and instructions for printing the print data with the embedded background image on receipt paper.

11. A computer-readable medium as described in claim 10, further comprising instructions for receiving from the host computer a configuration command containing configuration parameters for producing the background image, instructions for processing the selected unit image according to the configuration parameters to generate the background image data, and instructions for producing the print data with the embedded background image.

12. A computer-readable medium as described in claim 11, wherein the configuration command contains information specifying a print color for the background image.

13. A computer-readable medium as described in claim 11, wherein the configuration command contains information specifying a data file of the selected unit image.

14. A computer-readable medium as described in claim 11, wherein the configuration command contains information specifying a data file of the selected filter.

15. A computer-readable medium as described in claim 11, wherein the configuration command contains information specifying an enlargement factor of the selected unit image.

16. A computer-readable medium as described in claim 11, wherein the configuration command contains information specifying the selected layout pattern for arranging the selected unit image.

17. A computer-readable medium as described in claim 11, wherein the configuration command contains information specifying a layout pitch of the selected unit image.

18. A computer-readable medium as described in claim 11, wherein the configuration command is generated by a printer driver embedded in the host computer.

19. A printing apparatus for processing print data generated by a host computer, the printing apparatus comprising:

an input terminal configured to acquire the print data from the host computer;

a background image data processor including
a unit image selection module configured to select a unit image to be used as a component of a background image,
a layout module configured to lay out multiple copies of the selected unit image in a selected layout pattern,
a filter selection module configured to select a filter for delineating an image area of the selected layout pattern or each copy in the layout pattern, and
a filtering module configured to apply the selected filter to the selected layout pattern or each copy in the layout pattern to determine where the copies of the selected unit image are to be printed to produce the background image data;

a generator configured to add the background image data to the print data to produce print data with an embedded background image; and a printing unit configured to print the print data with an embedded background image on receipt paper.

20. A printing apparatus as described in claim 19, wherein the printing unit is capable of color printing using a primary color and a secondary color different from the primary color, and is configured to print the print data using the primary color and to print the background image data using the secondary color.

21. A printing apparatus as described in claim 20, wherein the background image data is generated according to configuration parameters specified by a configuration command received from the host computer.

22. A printing apparatus as described in claim 21, wherein the configuration command contains information specifying a print color for the background image.

23. A printing apparatus as described in claim 21, further comprising a storage medium configured to store a plurality of unit images as data files, and wherein the configuration command contains information specifying the data file corresponding to the selected unit image.

24. A printing apparatus as described in claim 21, wherein the configuration command contains a command specifying the selected filter.

25. A printing apparatus as described in claim 21, wherein the configuration command contains information specifying an enlargement factor of the selected unit image.

26. A printing apparatus as described in claim 21, further comprising a storage medium configured to store a plurality of layout patterns, and wherein the configuration command contains information specifying a selected layout pattern.

27. A printing apparatus as described in claim 21, wherein the configuration command contains information specifying a layout pitch of the selected unit image.

28. A printing apparatus as described in claim 21, wherein the configuration command is generated by a printer driver embedded in the host computer.

29. A printing apparatus as described in claim 20, wherein the filter is in the form of an image data file.

30. A printing apparatus as described in claim 20, wherein the filter is in a form of an algorithm file representing a shape.

31. A printing apparatus as described in claim 20, wherein the filter is in a form of a functional expression defining a shape.

32. A printer driver to be used in a host computer connected to a printing apparatus, the printer driver comprising:

a print acquisition module configured to acquire print data from an application program executed by the host computer;

a background image data configuration module including
a unit image selection module configured to select a unit image to be used as a component of a background image,
a layout module configured to lay out multiple copies of the selected unit image in a selected layout pattern,
a filter selection module configured to select a filter for delineating an image area of the selected layout pattern or each copy in the layout pattern,
a filtering module configured to apply the selected filter to the selected layout pattern or each copy in the layout pattern to determine where the copies of the selected unit image are to be printed to produce the background image data, and a generator module configured to add the background image data to the print data to produce print data with an embedded background image; and a transmission unit configured to send the print data with an embedded background image to a printing apparatus.

33. A POS terminal, comprising:

a printing apparatus comprising
- an input terminal configured to acquire the print data from the host computer,
- a background image data processor including
  - a unit image selection module configured to select a unit image to be used as a component of a background image,
  - a layout module configured to lay out multiple copies of the selected unit image in a selected layout pattern,
  - a filter selection module configured to select a filter for delineating the image area of the selected layout pattern or each copy in the layout pattern, and
  - a filtering module configured to apply the selected filter to the selected layout pattern or each copy in the layout pattern to determine where the copies of the selected unit image are to be printed to produce the background image data,
- a generator configured to add the background image data to the print data to produce print data with an embedded background image, and
- a printing unit configured to print the print data with an embedded background image to receipt paper; and a terminal device functioning as a host computer.

34. A POS terminal as described in claim 33, wherein the terminal device includes a printer driver and a printing apparatus.

35. A POS system, comprising:

at least one POS terminal comprising
- a printing apparatus comprising
  - an input terminal configured to acquire the print data from the host computer,
  - a background image data processor including
    - a unit image selection module configured to select a unit image to be used as a component of a background image,
    - a layout module configured to lay out multiple copies of the selected unit image in a selected layout pattern,
    - a filter selection module configured to select a filter for delineating the image area of the selected layout pattern or each copy in the layout pattern, and
    - a filtering module configured to apply the selected filter to the selected layout pattern or each copy in the layout pattern to determine where the copies of the selected unit image are to be printed to produce the background image data,
  - a generator configured to add the background image data to the print data to produce print data with an embedded background image, and
  - a printing unit configured to print the print data with an embedded background image to receipt paper, and
- a terminal device functioning as a host computer; and a POS server connected to each POS terminal over a network for managing the POS terminals.

* * * * *